(12) United States Patent
Zhu et al.

(10) Patent No.: US 10,884,180 B2
(45) Date of Patent: Jan. 5, 2021

(54) LIGHT GUIDE ASSEMBLY, BACKLIGHT AND DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Heling Zhu, Beijing (CN); Junjie Ma, Beijing (CN); Yuanda Lu, Beijing (CN); Bo Han, Beijing (CN); Liang Gao, Beijing (CN); Lu Yu, Beijing (CN); Pengfei Cheng, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 149 days.

(21) Appl. No.: 16/103,984

(22) Filed: Aug. 16, 2018

(65) Prior Publication Data
US 2019/0227222 A1 Jul. 25, 2019

(30) Foreign Application Priority Data
Jan. 23, 2018 (CN) .......................... 2018 1 0067421

(51) Int. Cl.
*F21V 8/00* (2006.01)
(52) U.S. Cl.
CPC ........... *G02B 6/0076* (2013.01); *G02B 6/009* (2013.01); *G02B 6/0043* (2013.01);
(Continued)
(58) Field of Classification Search
CPC .. G02B 6/0076; G02B 6/0043; G02B 6/0045; G02B 6/0055; G02B 6/009
See application file for complete search history.

(56) References Cited

U.S. PATENT DOCUMENTS

| 2013/0114292 | A1* | 5/2013 | Brick ................... G02B 6/0041 362/608 |
| 2015/0212250 | A1 | 7/2015 | Tai et al. |
| 2017/0010402 | A1* | 1/2017 | Ohkawa ............... G02B 6/0043 |

FOREIGN PATENT DOCUMENTS

| CN | 101566311 A | 10/2009 |
| CN | 101598860 A | 12/2009 |

(Continued)

OTHER PUBLICATIONS

Office Action dated Feb. 3, 2020 for corresponding application CN201810067421.4 with English translation attached.

*Primary Examiner* — Thomas M Sember
(74) *Attorney, Agent, or Firm* — Nath, Goldberg & Meyer; Joshua B. Goldberg; Stephanie F. Majkut

(57) ABSTRACT

A light guide assembly comprises: a first light guide member; and a second light guide member stacked on the first light guide member. The light guide assembly has first and second light incident surfaces located on different sides, and a light emitting surface and a bottom surface which are oppositely disposed in a thickness direction, the first light incident surface and the bottom surface are located on the first light guide member, and the second light incident surface and the light emitting surface are located on the second light guide member, and the bottom surface is provided with first dots having a density increasing in a direction away from the first light incident surface, and the light emitting surface is provided with second dots having a density increasing in a direction away from the second light incident surface.

17 Claims, 4 Drawing Sheets

(52) U.S. Cl.
 CPC ......... *G02B 6/0045* (2013.01); *G02B 6/0055* (2013.01); *G02B 6/0068* (2013.01)

(56) References Cited

FOREIGN PATENT DOCUMENTS

| | | |
|---|---|---|
| CN | 101886769 A | 11/2010 |
| CN | 103257391 A | 8/2013 |
| CN | 104808279 A | 7/2015 |
| CN | 106646718 A | 5/2017 |
| JP | 2000268617 A | 9/2000 |

\* cited by examiner

LIGHT GUIDE ASSEMBLY, BACKLIGHT AND DISPLAY APPARATUS

CROSS-REFERENCE TO RELATED APPLICATION

This application claims priority from Chinese patent application No. 201810067421.4 filed with the China Patent Office on Jan. 23, 2018, the disclosure of which is incorporated herein by reference in its entirety.

TECHNICAL FIELD

The present disclosure relates to a technical field of display technology, and particularly relates to a light guide assembly, a backlight and a display apparatus.

BACKGROUND

As a flat panel display device, TFT-LCD (Thin Film Transistor-Liquid Crystal Display) is widely used in the field of high performance display due to its properties of, for example, smaller size, lower power consumption, free of irradiation and lower production cost.

As a main component in a liquid crystal display, backlight provides backlight for normal display of a liquid crystal display. Generally, a backlight includes a light guide plate (LGP) or light guide film (LGF), a light source on the side thereof, and the like. However, such LGPs or LGFs typically have a single layer structure, which cannot realize switch between higher and lower color gamut and tends to produce a display screen with poor uniformity.

SUMMARY

The present disclosure has been accomplished in order to at least partially solve the problems in related art. The present disclosure provides a light guide assembly, a backlight and a display apparatus which realize switch between higher and lower color gamut while ensuring uniform light emission.

According to an aspect of the disclosure, there is provided a light guide assembly comprising:

a first light guide member; and a second light guide member stacked on the first light guide member via an intermediate dielectric layer, the light guide assembly has a first light incident surface and a second light incident surface located on different sides, and a light emitting surface and a bottom surface which are oppositely disposed in a thickness direction, the first light incident surface and the bottom surface are located on the first light guide member, and the second light incident surface and the light emitting surface are located on the second light guide member, and the bottom surface is provided with first dots having a density increasing in a direction away from the first light incident surface, and the light emitting surface is provided with second dots having a density increasing in a direction away from the second light incident surface.

In some embodiments, the first light guide member comprises the following parts sequentially and continuously distributed in a direction perpendicular to the thickness direction: a first light incident part having the first light incident surface and a first light emitting part, the second light guide member comprises the following parts sequentially and continuously distributed in a direction perpendicular to the thickness direction: a second light incident part having the second light incident surface and a second light emitting part, the first light incident part has a thickness greater than the first light emitting part, and the second light incident part has a thickness greater than the second light emitting part, and the first light emitting part and the second light emitting part are disposed opposite to each other, a lower surface of the first light emitting part is located within the bottom surface, and an upper surface of the second light emitting part is located within the light emitting surface.

In some embodiments, the lower surface of the first light emitting part does not exceed a bottom of the first light incident part and a bottom of the second light incident part, and the upper surface of the second light emitting part does not exceed a top of the second light incident part and a top of the first light incident part.

In some embodiments, the first light emitting part has a uniform thickness, and the second light emitting part has a uniform thickness.

In some embodiments, a lower surface of the first light incident part is in the same plane as the lower surface of the first light emitting part, and an upper surface of the second light incident part is in the same plane as the upper surface of the second light emitting part.

In some embodiments, the first light incident part comprises a first inclined surface transitioning from a light incident end having a first thickness to the first light emitting part having a second thickness, and the second light incident part comprises a second inclined surface transitioning from a light incident end having a third thickness to the second light emitting part having a fourth thickness.

In some embodiments, the first light guide member further comprises a first extending part extending from an end of the first light emitting part to the second inclined surface, and a lower surface of the first extending part is in the same plane as the lower surface of the first light emitting part and provided with the first dots, and the second light guide member further comprises a second extending part extending from an end of the second light emitting part to the first inclined surface, and an upper surface of the second extending part is in the same plane as the upper surface of the second light emitting part and provided with the second dots.

In some embodiments, a microstructure is disposed on an upper surface of the light incident end of the first light incident part having the first thickness, and a microstructure is disposed on a lower surface the light incident end of of the second light incident part having the third thickness.

In some embodiments, a reflective layer is disposed between the first extending part and the second inclined surface, and a reflective layer is disposed between the second extending part and the first inclined surface.

In some embodiments, the first light guide member and the second light guide member are two independent structures attached into the light guide assembly, and an attached surface of the two forms an intermediate dielectric surface of the intermediate dielectric layer.

In some embodiments, the light guide assembly has a thickness of 0.35 mm to 0.55 mm.

In some embodiments, the first light emitting part and the second light emitting part each have a thickness of 0.1 mm to 0.25 mm.

In some embodiments, the first light guide member and the second light guide member are the same in structure.

In some embodiments, a thickness of the first light emitting part decreases from an end proximal to the first light incident part to the other end distal to the first light incident part, and a thickness of the second light emitting part decreases from an end proximal to the second light incident part to the other end distal to the second light incident part.

In some embodiments, a bottom of the first light incident part and a bottom of the second light incident part protrude from the lower surface of the first light emitting part, and a top of the first light incident part and a top of the second light incident part protrude from the upper surface of the second light emitting part.

In some embodiments, the first light guide member and the second light guide member have a different material from the intermediate dielectric layer.

According to another aspect of the disclosure, there is provided a backlight comprising the above light guide assembly, a first light source and a second light source, the first light source has a different color gamut from the second light source, the first light source is located at a position corresponding to the first light incident surface of the light guide assembly, and the second light source is located at a position corresponding to the second light incident surface of the light guide assembly.

In some embodiments, the first light source has a greater optical efficiency than the second light source.

According to still another aspect of the disclosure, there is provided a display apparatus comprising the above backlight.

BRIEF DESCRIPTION OF DRAWINGS

In order to explain exemplary embodiments of the present disclosure or technical solutions in related art more clearly, drawings required for description of the exemplary embodiments or the related art will now be illustrated briefly. Obviously, the drawings described below are merely some exemplary drawings of the present disclosure, and other drawings may be obtained by those skilled in the art based on these drawings without any creative labor.

DETAILED DESCRIPTION

Hereinafter, technical solutions of the present disclosure will be clearly and completely described with reference to the accompanying drawings. Apparently, the described exemplary embodiments are only some but not all of the embodiments of the present disclosure. All other embodiments obtained by those of ordinary skill in the art based on an exemplary embodiment of the present disclosure without making any creative effort shall fall within the protection scope of the present disclosure.

Figure 1:
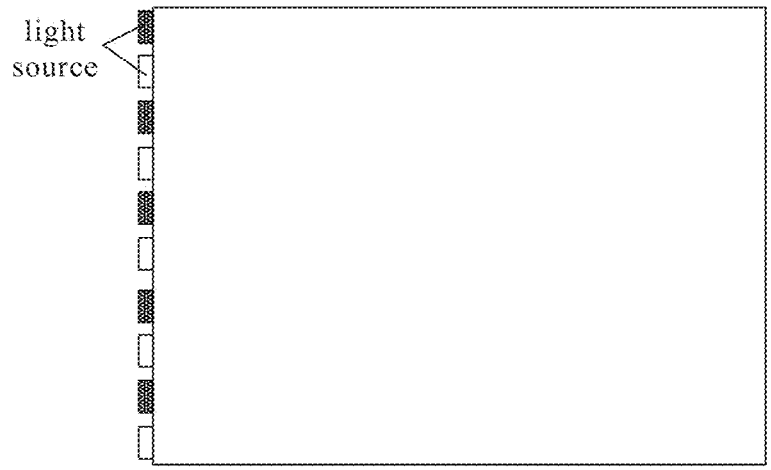
FIG. 1 is a structural schematic view showing a backlight in related art.

In the related art, as shown in FIG. 1, a backlight with an adjustable color gamut includes light sources having different color gamut spaced apart at a light incident surface thereof, provides a display environment with a lower color gamut by turning on a light source having a lower color gamut, and provides a display environment with a higher color gamut by turning on a light source having a higher color gamut.

However, for the backlight in FIG. 1, when the backlight is normally turned on, a hotspot often occurs near a position where a light guide plate is close to the light incident surface, resulting in poor uniformity of the display screen and reduced image quality. That is, while realizing switch between higher and lower color gamut, the backlight has a poor uniformity in the screen since the light emitted by the light guide plate is not uniform.

In view of the above, the present disclosure proposes the following exemplary embodiments.

Figure 2:
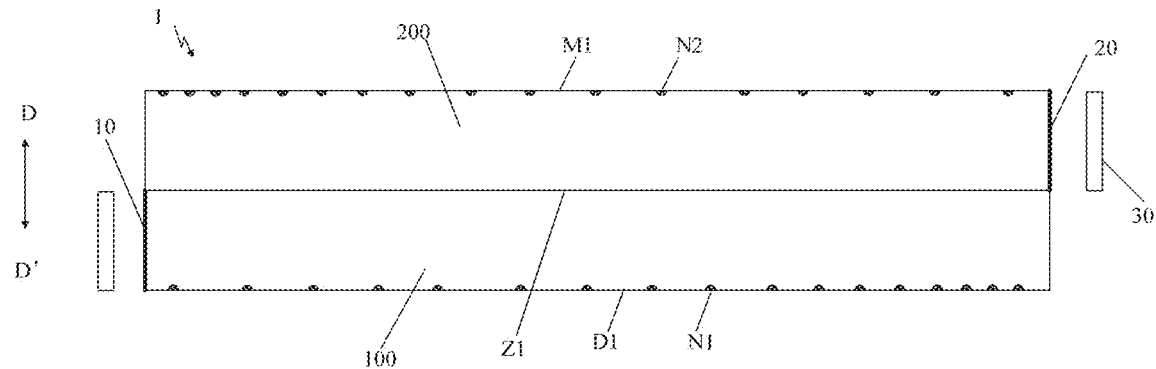
FIG. 2 is a structural schematic view showing a light guide assembly according to an exemplary embodiment of the disclosure.

According to an aspect of the disclosure, an exemplary embodiment of the disclosure provides a light guide assembly. As shown in FIG. 2, the light guide assembly 1 has a first light incident surface 10 and a second light incident surface 20 located on different sides (typically two opposite sides), and a light emitting surface M1 and a bottom surface D1 which are oppositely disposed in a thickness direction D-D'. The light guide assembly may be in the form of a light guide plate or a light guide film, which is not limited herein.

As shown in FIG. 2, the light guide member 1 further includes an intermediate dielectric surface Z1 of an intermediate dielectric layer between the light emitting surface M1 and the bottom surface D1, so as to divide the light guide assembly 1 into a first light guide member 100 and a second light guide member 200 in the thickness direction D-D'.

In an exemplary embodiment of the disclosure, the first light incident surface 10 and the bottom surface D1 are located on the first light guide member 100, and the bottom surface D1 is provided with first dots N1 having a density increasing in a direction away from the first light incident surface 10; the second light incident surface 20 and the light emitting surface M1 are located on the second light guide member 200, and the light emitting surface M1 is provided with second dots N2 having a density increasing in a direction away from the second light incident surface 20.

Thus, when the light guide assembly 1 is applied to the backlight, by disposing the first light source and the second light source of different color gamut on the first light incident surface 10 and the second light incident surface 20 respectively, it is ensured that light emitted from the first source at a position corresponding to the first light incident surface 10 is introduced into the first light guide member 100 and emitted uniformly under an action of the first dots, and light emitted from the second source at a position corresponding to the second light incident surface 20 is introduced into the second light guide member 200 and emitted uniformly under an action of the second dots. That is, by means of the light guide assembly 1 of the disclosure, the switch between higher and lower color gamut is realized while ensuring uniform light emission. It should be understood that in order to illustrate a positional relationship between the light source and the light incident surface of the light guide assembly 1, FIG. 2 shows light sources 30 at two sides of the light guide assembly 1.

In addition, it should be understood that, in the exemplary embodiment of the disclosure, the first light incident surface 10 and the second light incident surface 20 are disposed on different sides of the light guide assembly 1. In this way, when the light guide assembly 1 is applied to the backlight, light sources of different color gamut are mounted on the first light incident surface 10 and the second light incident surface 20 at different sides. Compared with the related art in which two light sources of different color gamut are mounted on the same light incident surface, the design of the disclosure may ensure uniform light emission, realize switch between higher and lower color gamut while improving heat dissipation performance of the light source as well as reliability.

It should be noted here that, firstly, the light emitting surface M1 and the bottom surface D1 of the light guide assembly 1 are defined from the perspective of applications of the light guide assembly 1. Specifically, light is emitted from the light emitting surface M1 to provide backlight for the display apparatus. Apparently, light may also be emitted from the bottom surface D1, but an outer side of the bottom surface D1 is typically provided with a reflective layer for reflecting the emitted light, which is finally still emitted from the light emitting surface M1 through the light guide assembly 1.

Secondly, based on setting directions of the light emitting surface M1 and the bottom surface D1 in the light guide assembly 1, for the light guide assembly 1 itself, a direction from the bottom surface D1 to the light emitting surface M1 may be regarded as a direction of the light guide assembly 1 from bottom to top. Upper and lower directions in subsequent exemplary embodiments also make reference to the directions of the top and the bottom, that is, "upper" corresponds to a direction toward the top, and "lower" corresponds to a direction toward the bottom.

Thirdly, the first dots N1 in the bottom surface D1 of the first light guide member 100 may break a total reflection of the light introduced into the first light guide member 100 from the first light incident surface 10, so as to emit the light. In addition, since an intensity of the light entering the first light guide member 100 gradually decreases in a direction away from the first light incident surface 10, in order to ensure uniform light emission from the first light guide member 100, a density of the first dots 1 is typically set to be increasing in a direction away from the first light incident surface 10, so that an extraction rate of light in the direction away from the first light incident surface is correspondingly increased, thereby ensuring uniform light emission. The second dots N2 in the second light guide member 200 is arranged in a similar manner, which is not repeated here. It can be seen that, in the exemplary embodiment of the disclosure, the light guide assembly 1 sets dots for the first light guide member 100 and the second light guide member 200 respectively, thereby effectively ensuring that the two light guide members both emit light uniformly during respective operations.

Obviously, it should be understood here that the second dots N2 on the light emitting surface M1 of the second light guide member 200 does not affect a light emitting efficiency of the light emitted from the first light guide member 100 (which is perpendicular or approximately perpendicular to the incident direction), that is, the second dots does not affect uniformity of the light emitted from the first light guide member 100. Similarly, the first dots N1 on the bottom surface D1 of the first light guide member 100 does not affect uniformity of the light emitted from the second light guide member 200, thereby ensuring a uniform light emission achieved by the first light guide member 100 and the second light guide member 200 when the entire light guide assembly 1 is applied to the backlight.

In addition, those skilled in the art should understand that the existing light source (light bar) has a greater thickness due to limitations of the manufacturing process, so a thickness of the light guide plate (or light guide film) on which the light source is mounted should be at least the thickness of the light source. Thus, for the light guide assembly in the exemplary embodiment of the disclosure, as shown in FIG. 2, thicknesses of the first light incident surface 10 and the second light incident surface 20 in the light guide assembly 1 also need to satisfy the thickness of the light sources 30.

Figure 3A:
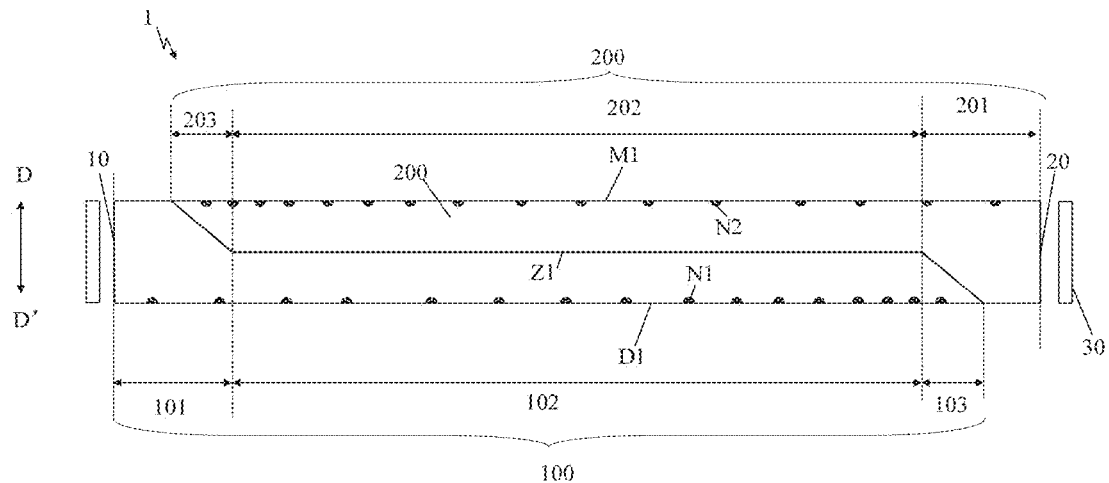
FIG. 3*a* is a structural schematic view showing another light guide assembly according to an exemplary embodiment of the disclosure.
Figure 3B:
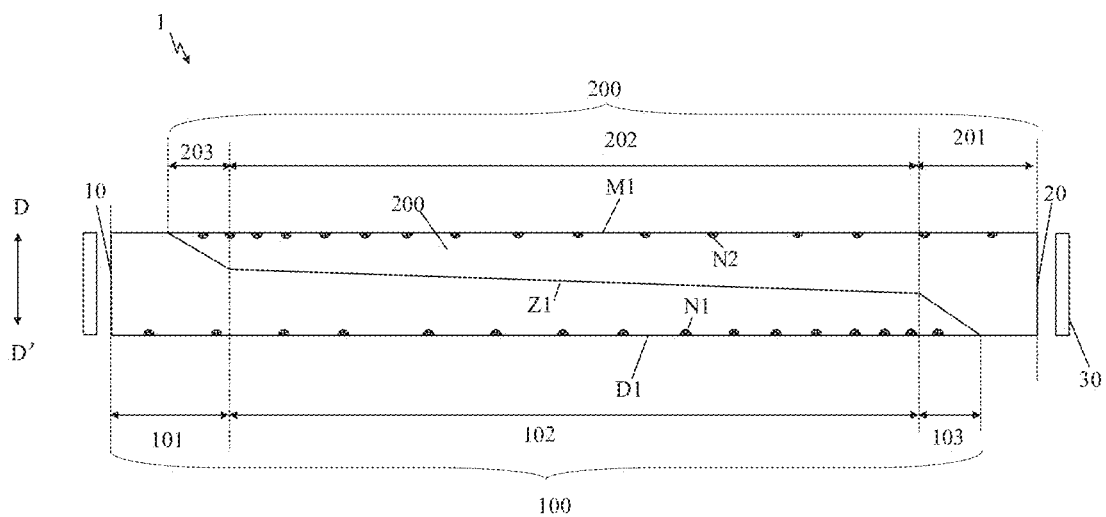
FIG. 3*b* is a structural schematic view showing still another light guide assembly according to an exemplary embodiment of the disclosure.

Based on the above description, some exemplary embodiments of the disclosure provide other types of light guide assemblies 1. As shown in FIGS. 3a and 3b, the first light guide member 100 includes the following parts sequentially and continuously distributed in a direction perpendicular to the thickness direction D-D': a first light incident part 101 in which the first incident surface 10 is located and a first light emitting part 102. The second light guide member 200 includes the following parts sequentially and continuously distributed in a direction perpendicular to the thickness direction D-D': a second light incident part 201 in which the second incident surface 20 is located and a second light emitting part 202. In an exemplary embodiment of the disclosure, the first light incident part 101 has a thickness greater than the first light emitting part 102, and the second light incident part 201 has a thickness greater than the second light emitting part 202; and the first light emitting part 102 and the second light emitting part 202 are disposed opposite to each other, a lower surface of the first light emitting part 102 is located within the bottom surface D1, and an upper surface of the second light emitting part 202 is located within the light emitting surface M1.

In this way, with the premise that widths of the first light incident surface 10 and the second light incident surface 20 satisfy the thickness of the light sources 30, a thickness of the light guide assembly 1 may be reduced by reducing thicknesses of the first light emitting part 102 and the second light emitting part 202.

It should be noted here that the actual division of the first light incident part 101 and the first light emitting part 102 in the first light guide member 100 may refer to a position of a boundary between an effective display area and a non-display area when the light guide assembly 1 is used for a display apparatus, so that the first light incident part 101 corresponds to the non-display area, and the first light emitting part 102 corresponds to at least the effective display area. The second light incident part 201 and the second light emitting part 202 in the second light guide member 200 are divided in a similar manner, which is not repeated here.

In an exemplary embodiment of the disclosure, as shown in FIGS. 3a and 3b, the lower surface of the first light emitting part 102 does not exceed a bottom of the first light incident part 101 and a bottom of the second light incident part 201, and the upper surface of the second light emitting part 202 does not exceed a top of the second light incident part 201 and a top of the first light incident part 101.

That is, in the light guide assembly 1, an upper surface of an entire light emitting part formed by the first light emitting part 102 and the second light emitting part 202 does not exceed the tops of the second light incident part 201 and the first light incident part 101, and a lower surface of the entire light emitting part does not exceed the bottoms of the first light incident part 101 and the second light incident part 201, that is, a thickness of the entire light emitting part is less than or equal to the thickness of the second light incident part 201 or the first light incident part 101.

Thus, in the light guide assembly (shown in FIGS. 3a and 3b), on the basis that thicknesses of the first light incident part and the second light incident part satisfy the thickness of the light source (light bar), the entire light emitting part formed by the first and second light emitting parts may have a thickness less than or equal to the thickness of the first light incident part or the second light incident part. That is, an overall thickness of the light guide assembly only needs to satisfy a thickness of a single light source (light bar). Compared with the light guide assembly shown in FIG. 2, it is equivalent to that a thickness of one of the light guide members is reduced to achieve the thickness of the light guide assembly shown in FIGS. 3a and 3b (if there are two light guide members with the same thickness as shown in FIG. 2, it is equivalent to that the thickness is reduced by half). Thus, the thickness of the light guide assembly may be greatly reduced while ensuring uniform light emission and switch between higher and lower color gamut, thereby expanding the application range of the light guide assembly.

In addition, for the first light emitting part 102 and the second light emitting part 202, as shown in FIG. 3a, the first light emitting part 102 has a uniform thickness, and the second light emitting part 202 has a uniform thickness. That is, portions of the intermediate dielectric surface Z1 corresponding to the first light emitting part 102 and the second light emitting part 202 are parallel to the bottom surface D1 and the light emitting surface M1.

Further, as shown in FIG. 3b, the portions of the intermediate dielectric surface Z1 corresponding to the first light emitting part 102 and the second light emitting part 202 may be inclined surfaces, that is, not parallel to the bottom surface D1 and the light emitting surface M1. In this case, the first light emitting part 102 and the second light emitting part 202 are not uniform in thickness. Obviously, with this arrangement, it is ideal that, as shown in FIG. 3b, an inclined direction of the above portions of the intermediate dielectric surface Z1 should ensure that thicknesses of the first light guide member 100 and the second light guide member 200 decrease from an end proximal to a respective light incident part to the other end distal to the respective light incident part as much as possible, so as to improve an introduction efficiency of the light.

Obviously, in consideration of the actual manufacturing process, the arrangement as shown in FIG. 3a, where the first light emitting part 102 has a uniform thickness, and the second light emitting part 202 has a uniform thickness, is often adopted in practice. In this case, the first light emitting part 102 and the second light emitting part 202 may have the same thickness or have different thicknesses. Obviously, it may also be set selectively according to actual requirements.

Taking the light guide member as shown in FIG. 3a, where the lower surface of the first light emitting part 102 does not exceed a bottom of the first light incident part 101 and a bottom of the second light incident part 201, the upper surface of the second light emitting part 202 does not exceed a top of the first light incident part 101 and a top of the second light incident part 201, the first light emitting part 102 has a uniform thickness, and the second light emitting part 202 has a uniform thickness, as an example, a further explanation will be made for the present application.

Figure 5A:
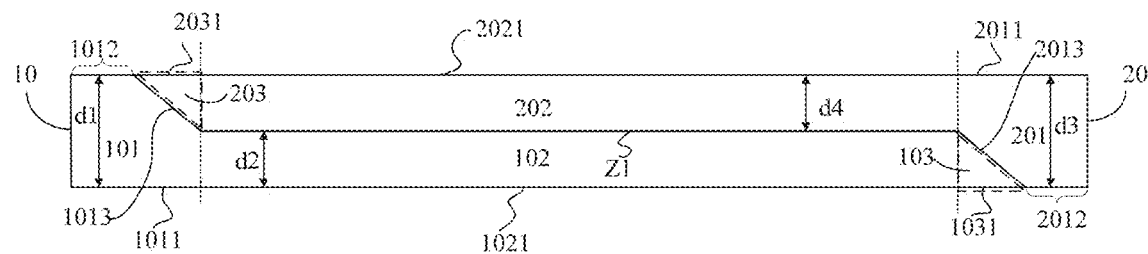
FIG. 5*a* is a schematic view showing a specific structure of the light guide assembly of FIG. 3*a*.
Figure 5B:
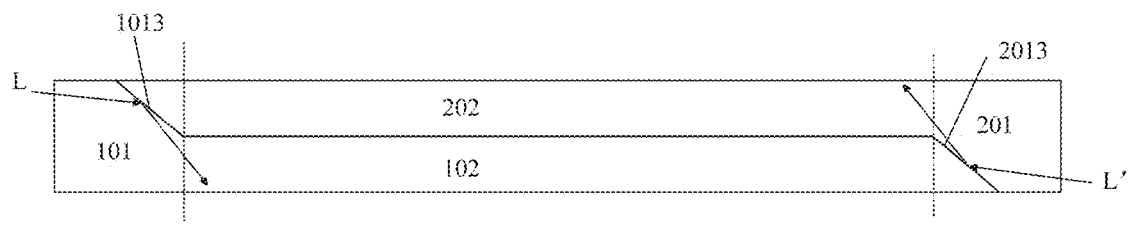
FIG. 5*b* is a schematic view showing a light path at some positions of the light guide assembly of FIG. 5*a*.
Figure 6:
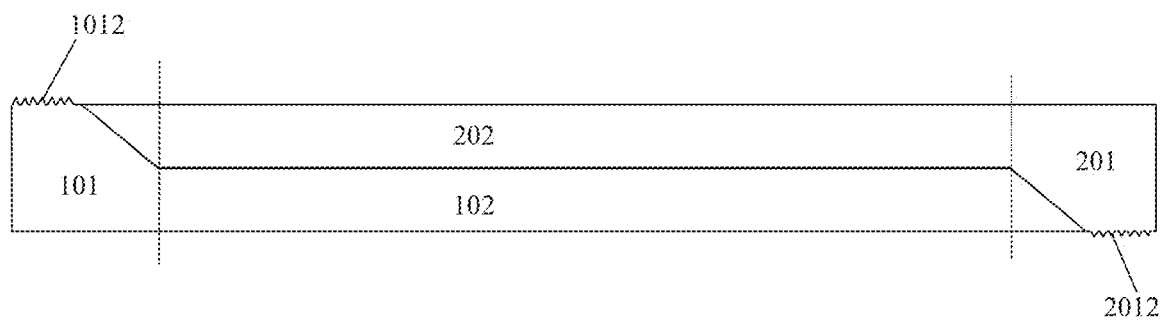
FIG. 6 is a schematic view showing a microstructure in another light guide assembly according to an exemplary embodiment of the disclosure.

The arrangement, where the lower surface of the first light emitting part 102 does not exceed a bottom of the first light incident part 101 and a bottom of the second light incident part 201, and the upper surface of the second light emitting part 202 does not exceed a top of the first light incident part 101 and a top of the second light incident part 201, will now be further explained with reference to FIG. 4. It should be understood that the dots are not shown in FIG. 4 or in FIGS. 5a, 5b, and 6 illustrated below for the purpose of clearly showing the components to be described.

Specifically, that the lower surface of the first light emitting part 102 does not exceed a bottom of the first light incident part 101 and a bottom of the second light incident part 201 refers to the following description.

Figure 4:
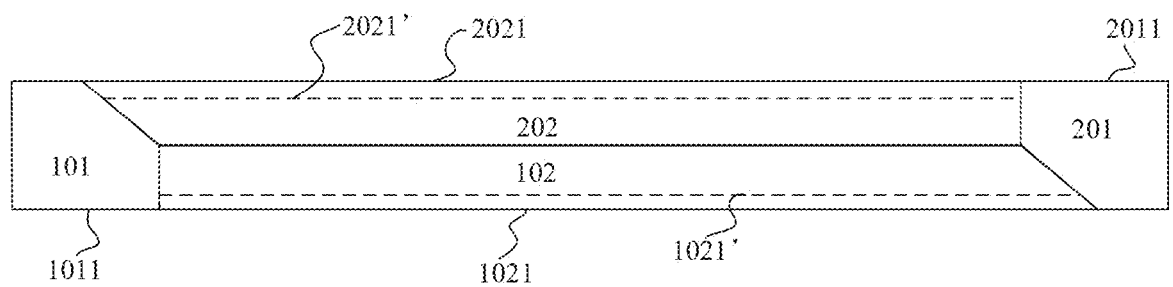
FIG. 4 is a structural schematic view showing yet another light guide assembly according to an exemplary embodiment of the disclosure.

In terms of "the lower surface of the first light emitting part 102 does not exceed a bottom of the first light incident part 101", referring to FIG. 4, it means that the lower surface (referring to the lower surface 1021 of the first light emitting part 102 indicated by the solid lines in FIG. 4) of the first light emitting part 102 may be flush with the bottom of the first light incident part 101; or that the bottom of the first light incident part 101 protrudes from the lower surface (referring to the lower surface 1021' of the first light emitting part 102 indicated by the dash lines in FIG. 4) of the first light emitting part 102. The disclosure does not limit which method is adopted; but obviously, in consideration of, for example, the actual manufacturing process, subsequent assembly of the light guide assembly, and light utilization efficiency of the entire light guide assembly, in an exemplary embodiment, the lower surface 1021 (solid lines) of the first light emitting part 102 may be configured to be flush with the bottom of the first light incident part 101.

Obviously, for the bottom of the first light incident part 101, in consideration of the actual manufacturing process and subsequent assembly, it is ideal that the bottom of the first light incident part 101 is a plane, that is, the lower surface 1011 of the first light incident part 101 shown in FIG. 4. The lower surface 1011 of the first light incident part 101 is in the same plane as the lower surface 1021 of the first light emitting part 102, and the lower surface 1011 of the first light incident part 101 and the lower surface 1021 of the first light emitting part 102 are both located within the bottom surface D1.

In terms of "the lower surface of the first light emitting part 102 does not exceed a bottom of the second light incident part 201", referring to FIG. 4, it means that the lower surface (referring to the lower surface 1021 of the first light emitting part 102 indicated by the solid lines in FIG. 4) of the first light emitting part 102 may be flush with the bottom of the second light incident part 201; or that the bottom of the second light incident part 201 protrudes from the lower surface (referring to the lower surface 1021' of the first light emitting part indicated by the dash lines in FIG. 4)

of the first light emitting part 102. The disclosure does not limit which method is adopted; but obviously, in consideration of the thickness and light utilization efficiency of the entire light guide assembly, in an exemplary embodiment, the lower surface 1021 (solid lines) of the first light emitting part 102 may be configured to be flush with the bottom of the second light incident part 201.

Further, that the upper surface of the second light emitting part 202 does not exceed a top of the first light incident part 101 and a top of the second light incident part 201 refers to the following description.

In terms of "the upper surface of the second light emitting part 202 does not exceed a top of the second light incident part 201", referring to FIG. 4, it means that the upper surface (referring to the upper surface 2021 of the second light emitting part 202 indicated by the solid lines in FIG. 4) of the second light emitting part 202 may be flush with the top of the second light incident part 201; or that the top of the second light incident part 201 protrudes from the upper surface (referring to the upper surface 2021' of the second light emitting part 202 indicated by the dash lines in FIG. 4) of the second light emitting part 202. The disclosure does not limit which method is adopted; but obviously, in consideration of, for example, the actual manufacturing process, subsequent assembly of the light guide assembly, and light utilization efficiency of the entire light guide assembly, it is ideal that the upper surface of the second light emitting part 202 is flush with the top of the second light incident part 201.

Obviously, for the top of the second light incident part 201, in consideration of the actual manufacturing process and subsequent assembly, it is ideal that the top of the second light incident part 201 is a plane, that is, the upper surface 2011 of the second light incident part 201 shown in FIG. 4. The upper surface 2011 of the second light incident part 201 is in the same plane as the upper surface 2021 of the second light emitting part 202, and the upper surface 2011 of the second light incident part 201 and the upper surface 2021 of the first light emitting part 202 are both located within the light emitting surface M1.

In terms of "the upper surface of the second light emitting part 202 does not exceed a top of the first light incident part 101", referring to FIG. 4, it means that the upper surface (referring to the upper surface 2021 of the second light emitting part 202 indicated by the solid lines in FIG. 4) of the second light emitting part 202 may be flush with the top of the first light incident part 101; or that the top of the first light incident part 101 protrudes from the upper surface (referring to the upper surface 2021' of the second light emitting part 202 indicated by the dash lines in FIG. 4) of the second light emitting part 202. The disclosure does not limit which method is adopted; but obviously, in consideration of the thickness and light utilization efficiency of the entire light guide assembly, in an exemplary embodiment, the upper surface (solid lines) of the second light emitting part 202 may be configured to be flush with the top of the first light incident part 101.

As can be seen from the foregoing, for the first light guide member 100, as shown in FIG. 5a, the top end of the first light incident part 101 definitely protrude from the upper surface of the first light emitting part 102 (i.e., a portion of the intermediate dielectric surface Z1 corresponding to the first light emitting part 102). The first thickness d1 of a light incident end of the first light incident part 101 closer to the first light incident surface 10 is greater than the second thickness d2 of the first light emitting part 102. However, for the continuously distributed first light incident part 101 and first light emitting part 102, the first light incident part 101 definitely have a transition zone with a gradually changed thickness through which the first light guide member 100 may transition from the light incident end having the first thickness d1 to the first light emitting part 102 having the second thickness d2.

Specifically, as shown in FIG. 5a, in an exemplary embodiment of the disclosure, the first light incident part 101 transitions from the light incident end having the first thickness d1 to the first light emitting part 102 having the second thickness d2 (d1>d2) along the first inclined surface 1013 in the transition zone. Thus, as shown in FIG. 5b, light L incident from the first light incident surface 10 enters the first light emitting part 102 after being reflected at the first inclined surface 1013, and thus is utilized, thereby improving light utilization efficiency of the light guide assembly.

Similarly, as shown in FIG. 5a, for the second light guide member 200, the second light incident part 201 definitely have a transition zone with a gradually changed thickness through which the second light guide member 200 may transition from the light incident end with the third thickness d3 to the second light emitting part 202 with the fourth thickness d4 (d3>d4). Similarly, as shown in FIG. 5a, in an exemplary embodiment of the disclosure, the second light incident part 201 transitions from the light incident end having the third thickness d3 to the second light emitting part 202 having the fourth thickness d4 along the second inclined surface 2013 in the transition zone. Thus, as shown in FIG. 5b, light L' incident from the second light incident surface 20 enters the second light emitting part 202 after being reflected at the second inclined surface 2013, and thus is utilized, thereby improving light utilization efficiency of the light guide assembly.

In addition, in consideration of the actual manufacturing process, it is ideal that, as shown in FIG. 5a, an upper surface 1012 of the light incident end of the first light incident part 101 and a lower surface 2012 of the light incident end of the second light incident part 201 are both a plane, while the upper surface 1012 of the light incident end of the first light incident part 101 is located within the light emitting surface M1, and the lower surface 2012 of the light incident end of the second light incident part 201 is located within the bottom surface D1.

It should be understood here that when the first light incident part 101 includes the first inclined surface 1013, a thickness of the first light incident part 101 at a position of the light incident end is greater than a thickness of the first light incident part 101 at a position of the inclined surface 1013. Here, the thickness of the first light incident part 101 actually refers to the thickness d1 at the position of the light incident end of the first light incident part 101. Similarly, the thickness of the second light incident part 201 actually refers to the thickness d3 at the position of the light incident end of the second light incident part 201.

In the present disclosure, the specific shape of the second light guide member 200 at a position corresponding to the first inclined surface 1013 of the first light guide member 100 is not limited. The second light guide member 200 may cover or not cover or not fully cover the first inclined surface 1013. Obviously, in order to increase a light emitting area of the second light guide member 200 to improve light utilization efficiency of the light guide assembly and adapt to a narrow-edge frame design of the display apparatus, in an exemplary embodiment of the disclosure, as shown in FIG. 5a, the second light guide member 200 further includes a second extending part 203 extending from an end of the second light emitting part 202 to the first inclined surface

1013. Second dots is provided on an upper surface of the second extending part 203 (referring to the arrangement of the second dots in FIG. 3a).

Obviously, a reflective layer may be provided between the second extending part 203 and the first inclined surface 1013, so as to further improve reflectance of light incident on the first inclined surface 1013 and thus effectively improve light utilization efficiency of the light guide assembly.

In addition, in consideration of the actual manufacturing process, it is ideal that, as shown in FIG. 5a, an upper surface 2031 of the second extending part 203 is within the same plane as the upper surface 2021 of the second light emitting part 202, that is, the upper surface 2031 of the second extending part 203 and the upper surface 2021 of the second light emitting part 202 are both located within the light emitting surface M1.

Similarly, for the first light guide member 100, as shown in FIG. 5a, in an exemplary embodiment of the disclosure, the first light guide member 100 further includes a first extending part 103 extending from an end of the first light emitting part 102 to the second inclined surface 2013. First dots is provided on a lower surface of the first extending part 103 (referring to the arrangement of the first dots in FIG. 3a). Thus, a light emitting area of the first light guide member 100 is increased to improve light utilization efficiency of the light guide assembly and adapt to a narrow-edge frame design of the display apparatus.

Similarly, a reflective layer may be provided between the first extending part 103 and the second inclined surface 2013, so as to further improve reflectance of light incident on the second inclined surface 2013 and thus effectively improve light utilization efficiency of the light guide assembly.

In addition, in consideration of the actual manufacturing process, it is ideal that, as shown in FIG. 5a, a lower surface 1031 of the second extending part 103 is within the same plane as the lower surface 1021 of the first light emitting part 102, that is, the lower surface 1031 of the first extending part 103 and the lower surface 1021 of the first light emitting part 102 are both located within the bottom surface D1.

In an exemplary embodiment of the disclosure, as shown in FIG. 6, a microstructure is provided on the upper surface 1012 of the light incident end of the first light incident part 101 to reduce an intensity of emitted light incident from the first light incident surface 10 at this position, thereby reducing uneven light emitted at an edge position of the display apparatus including the light guide assembly.

Similarly, in an exemplary embodiment of the disclosure, as shown in FIG. 6, a microstructure is provided on the lower surface 2012 of the light incident end of the second light incident part 201 to reduce an intensity of emitted light incident from the second light incident surface 20 at this position, thereby reducing uneven light emitted at an edge position of the display apparatus including the light guide assembly.

Hereafter, the intermediate dielectric surface Z1 where the light guide assembly 1 is divided into a first light guide member 100 and a second light guide member 200 in the thickness direction D-D' will be further explained.

Firstly, it should be understood that a material at a position of the intermediate dielectric surface Z1 (i.e., the material of the intermediate dielectric layer) has certain difference from the materials of the first layer member 100 and the second light guide member 200, so as to ensure that the light guide assembly 1 is divided into a first light guide member 100 and a second light guide member 200.

Specifically, in the actual processing, the light guide assembly 1 may be an integrated structure, for example, using 3D printing technology (but not limited thereto), and a material different to that of the first light guide member 100 and that of the second light guide member 200 is used to form the intermediate dielectric layer, so as to divide the entire light guide assembly 1 into the first light guide member 100 and the second light guide member 200.

As another example, the light guide assembly 1 may be a non-integral structure, for example, using a manufacturing process of an existing light guide film or light guide plate to form the independent structures of the first light guide member 100 and the second light guide member 200 satisfying the foregoing conditions respectively. Then, the first light guide member 100 is attached to the second light guide 200 to form the light guide assembly 1 of the disclosure. In this case, the first light guide member 100 is attached to the second light guide 200 to form the light guide assembly 1, and the intermediate dielectric surface Z1 is formed on an attached surface of the two. It should be understood here that the intermediate dielectric layer typically includes optical cement, a few clearances, or other materials that are different from the materials of the first light guide member 100 and the second light guide member 200.

Obviously, in this case, individual parts of the first light guide member 100 or the second light guide member 200 in the light guide assembly 1 should also fall within the protection scope of the present disclosure. It should be further noted here that when the first light guide member 100 and the second light guide member 200 are two independent structures, for the second light guide member 200, as shown in FIG. 3a, the second dots N2 may also be located on a plane opposite to the light emitting surface M1. Obviously, in consideration of the actual mounting and light emitting efficiency, it is ideal to dispose the second dots on the light emitting surface.

On this basis, it is ideal that the first light guide member 100 has an identical structure as the second light guide member 200. Especially, in the case where the first light guide member 100 and the second light guide member 200 are two independent structures, the same manufacturing condition may be adopted to form light guide members with the same structure, and any two of the light guide members may be attached together according to the foregoing requirements of the light guide assembly.

Further, in an exemplary embodiment of the disclosure, the light guide assembly has a thickness of 0.35 mm to 0.55 mm. The first light emitting part has a thickness of 0.1 mm to 0.25 mm, and the second light emitting part has a thickness of 0.1 mm to 0.25 mm.

Specifically, limited by a thickness of the light source, the thickness of the light guide assembly is typically required to satisfy a thickness of the light bar, 0.35 mm, that is, the light guide assembly needs to have a thickness greater than or equal to 0.35 mm. It will be too large if the thickness of the light guide assembly is greater than 0.55 mm, which is unfavorable to a light and thin design of the display apparatus and limits applications thereof. Therefore, it is ideal that the light guide assembly has a thickness of 0.35 mm to 0.55 mm, for example, 0.4 mm.

On this basis, for the first and second light emitting parts, if the thickness of the first and second light emitting parts is less than 0.1 mm, it will result in reduced light utilization efficiency of the entire light guide assembly; and if the thickness is greater than 0.25 mm, the thickness of the entire light guide assembly will be inevitably increased. Therefore, in an exemplary embodiment of the disclosure, the first light emitting part has a thickness of 0.1 mm to 0.25 mm; and/or the second light emitting part has a thickness of 0.1 mm to 0.25 mm. For example, the first light emitting part has a thickness of 0.2 mm, and the second light emitting part has a thickness of 0.2 mm.

Figure 7:
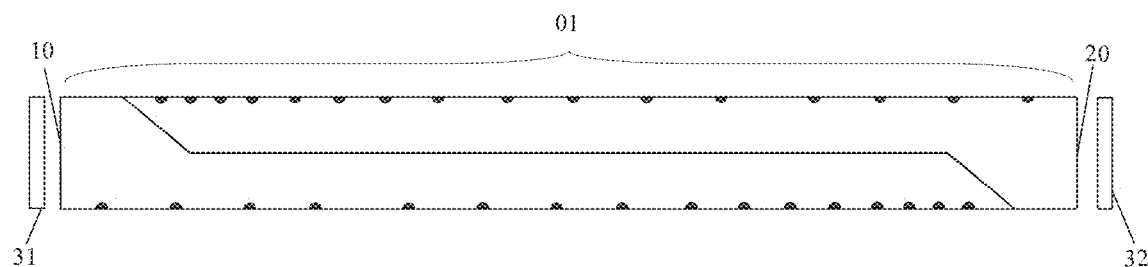
FIG. 7 is a structural schematic view showing a backlight according to an exemplary embodiment of the disclosure.

According to another aspect of the disclosure, there is provided a backlight. As shown in FIG. 7, the backlight includes any one of the foregoing light guide assemblies 1, a first light source 31 (or a first light bar including a first light source), and a second light source 32 (or a second light bar including a second light source). The first light source 31 has a different color gamut from the second light source 32, and the first light source 31 and the second light source 32 are disposed at respectively positions corresponding to the first light incident surface 10 (of the first light guide member) and the second light incident surface 20 (of the second light guide member) in the light guide assembly 1.

Specifically, a silicate LED of an ordinary color gamut and a red-green fluorescent LED of a higher color gamut may serve as the first light source 31 and the second light source 32, respectively.

Thus, by disposing the first light source and the second light source of different color gamut on the first light incident surface and the second light incident surface respectively, it is ensured that light emitted from the first source located near the first light incident surface is introduced into the first light guide member and emitted uniformly under an action of the first dots, and light emitted from the second source located near the second light incident surface is introduced into the second light guide member and emitted uniformly under an action of the second dots. That is, by means of the light guide assembly of the disclosure, the switch between higher and lower color gamut is realized while ensuring emitting light uniformly.

On this basis, considering that, in the backlight, the light from the first light source is emitted out of the first light guide member, and the light from the second light source is emitted out of the second light guide member, since the second light guide member is located at a light emitting side of the first light guide member, i.e., the light in the first light guide member has a longer optical path than the light in the second light guide member, the first light guide member will suffer slight loss in the light emitting efficiency. Therefore, it is ideal to provide the first light source with a greater optical efficiency than the second light source. For example, since the silicate LED has a greater optical efficiency than the red-green fluorescent LED, the first light source 31 may be set to be a silicate LED, while the second light source 32 is a red-green fluorescent LED.

The following is a further comparison and explanation of the performance of various aspects of the backlight in the present disclosure through actual light simulation performed by the applicant.

Specifically, referring to the light guide assembly 1 in FIG. 7, the first light source 31 is a silicate LED, and the second light source 32 is a red-green fluorescent LED. The applicant performed an optical simulation comparison of the backlight of the disclosure with a conventional light guide plate, and the results are as follows.

As shown in the following table, it can be seen that the first light guide member and the second light guide member of the light guide assembly of the present disclosure are close to the conventional light guide plate in terms of light emitting amount, light emitting rate, light emitting direction, and the like. That is, the light guide assembly of the disclosure may ensure uniform light emission and switch between higher and lower color gamut while ensuring similar light emitting amount, light emitting rate and light emitting direction to the conventional light guide plate.

| type | light emitting amount | light emitting rate | light emitting direction |
|---|---|---|---|
| the second light guide member of the disclosure | 76 | 76% | close to a normal light emitting direction |
| the first light guide member of the disclosure | 68.5 | 68.5% | close to a normal light emitting direction |
| conventional light guide plate | 73.5 | 73.5% | normal light emitting direction |

Figure 8:
FIG. 8 is an image simulating light emitting uniformity from a first light guide member of the backlight according to an exemplary embodiment of the disclosure.
Figure 9:
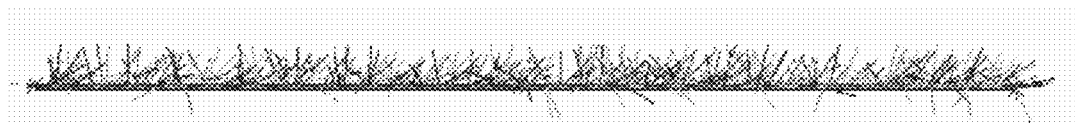
FIG. 9 is an image simulating light emitting uniformity from a second light guide member of the backlight according to an exemplary embodiment of the disclosure.
Figure 10:
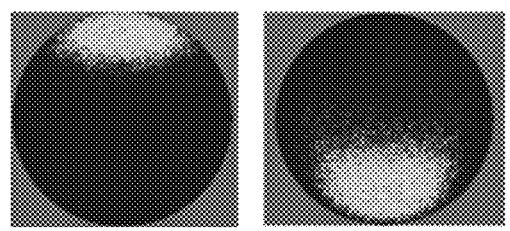
FIG. 10 are images simulating light emitting directions of the two light guide members of the backlight according to an exemplary embodiment of the disclosure.

Specifically, as mentioned above and referring to the image simulating light emitting uniformity from the first light guide member corresponding to the first light source shown in FIG. 8, and the image simulating light emitting uniformity from a second light guide member corresponding to the second light source as shown in FIG. 9, it can be seen that the first and second light guide members both have uniform light emission. Meanwhile, also referring to the image simulating a light emitting direction from the first light guide member corresponding to the first light source shown in (a) of FIG. 10, and the image simulating a light emitting direction from the second light guide member corresponding to the second light source shown in (b) of FIG. 10, it can be seen that the light emitting directions of the two form an angle within a certain range, which obviously satisfy requirements for the light guide assembly in terms of the light emitting direction in related art, relative to a normal of the light guide assembly, respectively. Further, light spots at upper and lower sides of the image in (a) and (b) of FIG. 10 indicate the first and second light source disposed at opposite sides of the light guide assembly.

In addition, specific operations of the two light guide members during operation of the backlight of the disclosure will be further compared and described below.

When operated alone, the second light guide member of the light guide assembly of the disclosure has a light emitting amount and a light emitting rate which are slightly larger than those of a conventional light guide plate, and most of the light is totally reflected and emitted after being broken by the second dots on the light emitting surface, while some of the light that does not satisfy the total reflection is reflected by the reflective layer of the bottom surface through the first light guide member to be reused.

When operated alone, the first light guide member of the light guide assembly of the disclosure has a light emitting amount and a light emitting rate which are slightly smaller than those of a conventional light guide plate but fall into a normal scope of the light emitting amount and the light emitting rate, and similar to a conventional light guide plate, the light is totally reflected after being broken by the first dots on the bottom surface, and emitted through the second light guide member. In this case, the second dots on the second light guide member has a certain degree of diffusion effect on the light emitted from the first light guide member, so that when the first light guide member is operated alone, although the light emitting amount and the light emitting rate are slightly lower than those of the conventional light guide plate, its beam angle and deflection angle will be slightly better than those of the conventional light guide plate.

According to another aspect of the disclosure, there is provided a display apparatus. The display apparatus includes the foregoing backlight including the foregoing light guide assembly, having the same beneficial effects as the light guide assemblies provided in the foregoing embodiments. The structure and beneficial effects of the light guide assemblies in the foregoing embodiments have been described in detail, which will not be repeated here.

It should be noted that, in an exemplary embodiment of the disclosure, the display apparatus may at least include a liquid crystal display panel which is applicable to liquid crystal displays, LCD TVs, digital albums, mobile phones, tablets or any other product or member having a display function.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A light guide assembly comprising:
a first light guide member; and
a second light guide member stacked on the first light guide member via an intermediate dielectric layer, wherein
the light guide assembly has a first light incident surface and a second light incident surface located on different sides, and a light emitting surface and a bottom surface which are oppositely disposed in a thickness direction,
the first light incident surface and the bottom surface are located on the first light guide member, and the second light incident surface and the light emitting surface are located on the second light guide member,
the bottom surface is provided with first dots having a density increasing in a direction away from the first light incident surface, and the light emitting surface is provided with second dots having a density increasing in a direction away from the second light incident surface,
the first light guide member comprises the following parts sequentially and continuously distributed in a direction perpendicular to the thickness direction: a first light incident part having the first light incident surface and a first light emitting part, the second light guide member comprises the following parts sequentially and continuously distributed in a direction perpendicular to the thickness direction: a second light incident part having the second light incident surface and a second light emitting part,
the first light incident part has a thickness greater than the first light emitting part, and the second light incident part has a thickness greater than the second light emitting part,
the first light emitting part and the second light emitting part are disposed opposite to each other, a lower surface of the first light emitting part is located within the bottom surface, and an upper surface of the second light emitting part is located within the light emitting surface, and wherein a bottom of the first light incident part and a bottom of the second light incident part protrude from the lower surface of the first light emitting part, and a top of the first light incident part and a top of the second light incident part protrude from the upper surface of the second light emitting part.

2. The light guide assembly of claim 1, wherein
the lower surface of the first light emitting part does not exceed a bottom of the first light incident part and a bottom of the second light incident part, and
the upper surface of the second light emitting part does not exceed a top of the second light incident part and a top of the first light incident part.

3. The light guide assembly of claim 1, wherein
the first light emitting part has a uniform thickness, and
the second light emitting part has a uniform thickness.

4. The light guide assembly of claim 3, wherein
the first light incident part comprises a first inclined surface transitioning from a light incident end having a first thickness to the first light emitting part having a second thickness, and
the second light incident part comprises a second inclined surface transitioning from a light incident end having a third thickness to the second light emitting part having a fourth thickness.

5. The light guide assembly of claim 4, wherein
the first light guide member further comprises a first extending part extending from an end of the first light emitting part to the second inclined surface, and a lower surface of the first extending part is in the same plane as the lower surface of the first light emitting part and provided with the first dots, and
the second light guide member further comprises a second extending part extending from an end of the second light emitting part to the first inclined surface, and an upper surface of the second extending part is in the same plane as the upper surface of the second light emitting part and provided with the second dots.

6. The light guide assembly of claim 4, wherein
a microstructure is disposed on an upper surface of the light incident end of the first light incident part having the first thickness, and
a microstructure is disposed on a lower surface of the light incident end of the second light incident part having the third thickness.

7. The light guide assembly of claim 4, wherein
a reflective layer is disposed between the first extending part and the second inclined surface, and
a reflective layer is disposed between the second extending part and the first inclined surface.

8. The light guide assembly of claim 3, wherein
the first light emitting part and the second light emitting part each have a thickness of 0.1 mm to 0.25 mm.

9. The light guide assembly of claim 1, wherein
a lower surface of the first light incident part is in the same plane as the lower surface of the first light emitting part, and
an upper surface of the second light incident part is in the same plane as the upper surface of the second light emitting part.

10. The light guide assembly of claim 9, wherein
the light guide assembly has a thickness of 0.35 mm to 0.55 mm.

11. The light guide assembly of claim 1, wherein
the first light guide member and the second light guide member are two independent structures attached into the light guide assembly, and an attached surface of the two forms an intermediate dielectric surface of the intermediate dielectric layer.

12. The light guide assembly of claim 1, wherein
the first light guide member and the second light guide member are the same in structure.

13. The light guide assembly of claim 1, wherein
a thickness of the first light emitting part decreases from an end proximal to the first light incident part to the other end distal to the first light incident part, and
a thickness of the second light emitting part decreases from an end proximal to the second light incident part to the other end distal to the second light incident part.

14. The light guide assembly of claim 1, wherein
the first light guide member and the second light guide member have a different material from the intermediate dielectric layer.

15. A backlight comprising the light guide assembly of claim 1, a first light source and a second light source, wherein
the first light source has a different color gamut from the second light source, the first light source is located at a position corresponding to the first light incident surface of the light guide assembly, and the second light source is located at a position corresponding to the second light incident surface of the light guide assembly.

16. The backlight of claim 15, wherein
the first light source has a greater optical efficiency than the second light source.

17. A display apparatus comprising the backlight of claim 15.

* * * * *